US012643818B2

(12) United States Patent
Rosenthal et al.

(10) Patent No.: US 12,643,818 B2
(45) Date of Patent: Jun. 2, 2026

(54) PLASTER FORMULA WITH INCREASED POROSITY

(71) Applicant: KNAUF GIPS KG, Iphofen (DE)

(72) Inventors: Guy L. Rosenthal, Wheaton, IL (US);
Christian Huch, Gurnee, IL (US);
Jeffrey F. Grussing, Trevor, WI (US);
Pamela L. Hargrove, Cary, IL (US)

(73) Assignee: KNAUF GIPS KG, Iphofen (DE)

( * ) Notice: Subject to any disclaimer, the term of this patent is extended or adjusted under 35 U.S.C. 154(b) by 647 days.

(21) Appl. No.: 18/074,664

(22) Filed: Dec. 5, 2022

(65) Prior Publication Data

US 2023/0382793 A1 Nov. 30, 2023

Related U.S. Application Data

(60) Provisional application No. 63/346,557, filed on May 27, 2022.

(51) Int. Cl.
| | |
|---|---|
| *C04B 11/02* | (2006.01) |
| *C04B 22/16* | (2006.01) |
| *C04B 24/04* | (2006.01) |
| *C04B 28/14* | (2006.01) |
| *C04B 103/22* | (2006.01) |
| *C04B 111/00* | (2006.01) |

(52) U.S. Cl.
CPC .............. *C04B 11/02* (2013.01); *C04B 22/16* (2013.01); *C04B 24/04* (2013.01); *C04B 28/146* (2013.01); *C04B 28/147* (2013.01); *C04B 2103/22* (2013.01); *C04B 2111/00939* (2013.01); *C04B 2111/00956* (2013.01); *C04B 2235/6027* (2013.01)

(58) Field of Classification Search
CPC ......... C04B 11/02; C04B 22/16; C04B 24/04; C04B 28/146; C04B 28/147; C04B 2103/22; C04B 2111/00939; C04B 2111/00956; C04B 2235/6027; C04B 28/14; C04B 28/145; C04B 22/142; C04B 11/002; C04B 40/0608; C04B 24/06; C04B 22/147
See application file for complete search history.

(56) References Cited

U.S. PATENT DOCUMENTS

| | | | |
|---|---|---|---|
| 2,391,855 | A | 12/1945 | Bean |
| 2,907,667 | A | 10/1959 | Johnson |
| 3,236,509 | A | 2/1966 | Blair |
| 3,307,195 | A | 2/1967 | Laub |
| 3,410,655 | A | 11/1968 | Ruter et al. |
| 3,748,290 | A | 7/1973 | Reingen et al. |
| 4,113,836 | A | 9/1978 | O'Connor |
| 4,117,070 | A | 9/1978 | O'Neill |
| 4,153,373 | A | 5/1979 | O'Neill |
| 4,183,908 | A | 1/1980 | Rolfe |
| 4,201,595 | A | 5/1980 | O'Neill |
| 4,234,345 | A | 11/1980 | Fassle |
| 4,360,386 | A | 11/1982 | Bounini et al. |
| 4,443,261 | A | 4/1984 | Nordqvist |
| 4,526,619 | A | 7/1985 | Nobukazu et al. |
| 6,355,099 | B1 | 3/2002 | Immordino et al. |
| 6,398,864 | B1 * | 6/2002 | Przybysz ................ C04B 28/14 |
| | | | 106/778 |
| 7,588,634 | B2 | 9/2009 | Lynn |
| 7,754,007 | B2 | 7/2010 | Lettkeman et al. |
| 8,343,273 | B1 | 1/2013 | Lettkeman et al. |
| 2006/0278132 | A1 | 12/2006 | Yu et al. |
| 2009/0101045 | A1 * | 4/2009 | Lettkeman ............ C04B 28/146 |
| | | | 106/779 |
| 2010/0291305 | A1 | 11/2010 | Wittbold et al. |
| 2012/0090508 | A1 | 4/2012 | Groza et al. |
| 2012/0167804 | A1 | 7/2012 | Perez-Pena |
| 2015/0024228 | A1 | 1/2015 | Li et al. |
| 2015/0376063 | A1 | 12/2015 | Francis et al. |
| 2016/0340251 | A1 | 11/2016 | Lettkeman et al. |

FOREIGN PATENT DOCUMENTS

| | | |
|---|---|---|
| CA | 420491 A | 5/1944 |
| CH | 551346 A | 7/1974 |
| CN | 104163589 A | 11/2014 |
| CN | 105503224 A | 4/2016 |
| CN | 106671249 A | 5/2017 |
| CN | 107775789 A | 3/2018 |
| CN | 110395936 A | 11/2019 |
| CN | 113479924 A | 10/2021 |
| EP | 0467025 A2 | 1/1992 |
| JP | 2016121048 A | 7/2016 |
| JP | 2019178024 A | 10/2019 |
| WO | WO2007/024420 A2 | 3/2007 |
| WO | WO2008/115929 A1 | 9/2008 |
| WO | WO 2013/148484 A1 | 10/2013 |

OTHER PUBLICATIONS

PCT Search Report dated Oct. 12, 2023 for PCT Application No. PCT/US2023/023107.

* cited by examiner

*Primary Examiner* — Marites A Guino-O Uzzle
(74) *Attorney, Agent, or Firm* — Pradip Sahu; Greer, Burns & Crain, Ltd

(57) ABSTRACT

In one aspect, a pottery plaster formulation with increased water absorption, comprising alpha stucco, continuously-calcined-in-a-kettle stucco, and a combination of Rochelle salt and one or more of the following: potassium sulfate and/or a phosphate compound. In another aspect, pottery plaster molds with increased water absorption and methods of making and using the pottery plaster molds for slip casting ceramic items.

16 Claims, No Drawings

PLASTER FORMULA WITH INCREASED POROSITY

CROSS-REFERENCE TO RELATED APPLICATIONS

This application claims the benefit of priority to U.S. Provisional Patent Application 63/346,557 filed May 27, 2022, the entire disclosure of which is herein incorporated by reference in its entirety.

TECHNICAL FIELD

This disclosure relates to pottery plaster formulations, pottery plaster molds with increased porosity and improved water absorption, methods for making pottery plaster molds, and methods for slip casting various products in the molds.

BACKGROUND

Pottery plaster is commonly used for making molds which are used for casting ceramic articles in various industries, including aircraft, automotive, sanitaryware, construction, tableware and many others where a shaped ceramic product may be needed. Pottery plaster molds are particularly suitable for producing ceramic products, including dishes, pots, toilets, and bathroom sinks among many others.

Conventionally, pottery plaster is formulated as a dry mixture in which calcined gypsum is the main component. Various additives may be optionally included in the mixture as well. Various pottery plaster formulations are known in the art, including those described in U.S. Pat. Nos. 2,391, 855, 4,443,261 and 6,398,864, all these patents are incorporated by reference herein.

A pottery plaster mold has to be sufficiently porous such that the mold would remove water from a casting ceramic product. In addition, the gypsum mold has to be strong enough to withstand handling and in order to be reusable. Thus, pottery plaster has to meet certain requirements for strength and also for porosity because a pottery plaster mold must be durable and reusable for many cycles, and at the same time, moisture and air should pass freely though the mold for efficient drying of a casting ceramic product and also in order to easily remove the ceramic product from the mold after the casting is completed. In order to meet both requirements, a blend of alpha stucco (for strength) and batch-made beta stucco (for porosity) is conventionally used, in which beta stucco is produced by the batch process, for example as described in U.S. Pat. No. 6,398,864. Batch-produced beta stucco tends to hydrate producing thin, needle-like gypsum crystals in a porous network that fits with the porosity requirements for pottery plaster applications.

In contrast to batch-produced beta stucco, beta stucco produced by continuous calcining in a kettle tends to hydrate by producing blocky or plate-like crystals. These blocky and plate-like crystals inhibit porosity, preventing water and air from being removed through a mold. It was conventionally believed in the field that using continuously produced stucco in pottery plaster formulations should be avoided or minimized because the stucco may produce pottery plaster formulations with unacceptably low porosity.

Thus, there exists the need for pottery plaster formulations with improved porosity.

SUMMARY

This disclosure provides pottery plaster formulations having improved moisture absorption properties.

In one aspect, this disclosure provides a pottery plaster composition, wherein the pottery plaster composition is a dry mixture comprising: alpha-calcined stucco, continuously-calcined-in-a-kettle (CCK) stucco, Rochelle salt, and at least one of the following: potassium sulfate and/or one or more phosphate compounds. In some embodiments, the pottery plaster composition may comprise 5 to 40 wt % of alpha stucco, 60 to 94 wt % of CCK stucco, 0.02 to wt % of Rochelle salt and 0.05 to 0.5 wt % of one or more of the following: potassium sulfate and/or the phosphate compound. In some preferred embodiments, the pottery plaster compositions may comprise the phosphate compound, and more preferably, the phosphate compound may include a trimetaphosphate salt and/or a tetrametaphosphate salt.

Some pottery plaster compositions according to this disclosure may further comprise at least one set-retarding agent.

Some pottery plaster compositions according to this disclosure may consist essentially of: 15 to 30 wt % of alpha-calcined stucco, 70 to 84 wt % of CCK stucco, 0.02 to 0.1 wt % of Rochelle Salt, and 0.05 to 0.3 wt % of potassium sulfate.

A pottery plaster composition according to this disclosure may have a shelf-life of at least 6 months. A pottery plaster composition according to this disclosure may have a water absorption capacity of at least 25 wt % when calculated as an increase in pottery plaster weight measured in the full immersion test at 60 minutes.

In another aspect, this disclosure provides a pottery plaster slurry comprising the pottery plaster composition according to this disclosure and water, wherein the pottery plaster slurry has a water-to-stucco (WSR) ratio by weight in the range from about 0.5 to about 0.9. Some pottery plaster slurries may comprise a set-retarding agent which can be preferably used in an amount from about 0.1 wt % to about 5 wt %, based on a weight of the pottery plaster composition.

In yet another aspect, this disclosure provides a method for making a pottery plaster mold, the method comprising:
  i) mixing a pottery plaster slurry comprising the pottery plaster composition according to this disclosure and water into a mixture;
  ii) pouring the mixture into a form; and
  iii) removing the pottery plaster mold from the form after the mixture hardened.

Some embodiments of the method include those in which the mixture has a water-to-stucco (WSR) ratio by weight in the range from about 0.5 to about 0.9.

In some embodiments, the method may further comprise adding to the mixture in step i) one or more set-retarding agents.

In yet another aspect, this disclosure provides a method for slip casting a ceramic article, the method comprising:
  i) preparing a clay slip;
  ii) pouring the clay slip into a pottery plaster mold, wherein the pottery plaster mold contains alpha stucco, CCK stucco, Rochelle salt and one or more of the following: potassium sulfate and/or a phosphate compound;
  iv) casting a ceramic article in the pottery plaster mold; and
  v) removing the ceramic article from the pottery plaster mold.

The casting of the method may include removing water from the casting ceramic article under negative pressure applied to the pottery plaster mold. Is some embodiments, the method may further comprise drying the pottery plaster mold after step v). In some embodiments, the method may comprise repeating steps i) to v) at least once.

DETAILED DESCRIPTION

In one aspect, this disclosure provides a pottery plaster formulation, wherein the pottery plaster formulation is a dry mixture comprising, consisting essentially of, or consisting of alpha stucco, continuously-calcined-in-kettle stucco and a combination of crystal growth modifiers, wherein the combination of crystal growth modifiers comprises, consists essentially of, or consists of Rochelle Salt and at least one of the following: potassium sulfate and/or one or more phosphate compounds.

In this disclosure, the term "Rochelle Salt" may be used interchangeably with potassium sodium tartrate tetrahydrate ($KNaC_4H_4O_6 \cdot 4H_2O$).

In this disclosure, the term "calcined gypsum" may be used interchangeably with calcium sulfate hemihydrate, stucco, calcium sulfate semi-hydrate, calcium sulfate half-hydrate or plaster of Paris.

In this disclosure, the term "gypsum" includes naturally mined gypsum (ore), land plaster as well as synthetic gypsum. The term "gypsum" may be used interchangeably with the term "calcium sulfate dihydrate." The "synthetic gypsum" can be also referred to as "chemical gypsum."

In this disclosure, the term "formulation" may be used interchangeably with the term "composition."

In this disclosure, a composition (formulation) or mixture may be referred to as "dry" composition or mixture. In this disclosure "dry" means that no water was added to the composition or mixture. Nevertheless, a dry composition or dry mixture may have some moisture content. For example, dry pottery plaster mixture may have a moisture content of about 1 wt % or less, about 0.05 wt % or less, or about 0 wt %.

In this disclosure, the term "about" means a range of plus/minus 5% of the stated value. For example, "about 100" means 100±5 and "about 200" means 200±10.

In this disclosure, the term "wt %" means percentage by weight.

When calcined gypsum ($CaSO_4 \cdot \frac{1}{2}H_2O$) is mixed with water, it hydrates and sets into a gypsum matrix. This setting reaction can be described by the following equation:

$$CaSO_4 \cdot \frac{1}{2}H_2O + \frac{3}{2}H_2O \rightarrow CaSO_4 \cdot 2H_2O$$

In this disclosure, "calcination" means a process by which gypsum ($CaSO_4 \cdot 2H_2O$) is dehydrated into calcined gypsum ($CaSO_4 \cdot \frac{1}{2}H_2O$). The process includes heating gypsum to evaporate crystalline water. Calcined gypsum can be produced in different crystalline forms such as alpha calcium sulfate hemihydrate and beta calcium sulfate hemihydrate.

U.S. Pat. No. 3,410,655 to Ruter et al., incorporated herein by reference in its entirety, teaches producing alpha calcium sulfate hemihydrate. Ruter et al. states the alpha-hemihydrate forms non-needle like crystals, as opposed to the beta calcium sulfate hemihydrate which forms needle-like crystals. Ruter et al. also states the usual plaster of Paris (calcium sulfate hemihydrate) is the beta calcium sulfate hemihydrate. However, depending on the manner of preparation, the plaster of Paris still contains more or less anhydrous calcium sulfate, and/or alpha calcium sulfate hemihydrate. Moreover, plasters with definite alpha-hemihydrate content exhibit higher strengths. Ruter et al. teaches to make alpha calcium sulfate hemihydrate in the form of non-needle-like crystals by elutriating the dihydrate with water to remove organic impurities and fine and slimy crystal portions, forming an aqueous suspension of the dihydrate at a pH about 1.5-6, and subsequently heating the suspension under closely controlled conditions.

U.S. Pat. No. 2,907,667 to Johnson, incorporated herein by reference in its entirety, states alpha-hemihydrate is prepared by heating the dihydrate under controlled vapor pressure conditions in the presence of steam or in an aqueous solution.

U.S. Pat. No. 4,234,345 to Fassle discloses fast-setting alpha calcium sulfate hemihydrate made from calcium sulfate dihydrate by hydrothermally recrystallizing calcium sulfate dihydrate to form a mixture containing 95%-99% by weight alpha calcium sulfate hemihydrate and 5 to 1% calcium sulfate dihydrate. The dihydrate in this mixture is then converted to beta calcium sulfate hemihydrate by calcining, except for a remainder of up to 0.5 percent of dihydrate, which remains in the mixture.

U.S. Pat. No. 7,588,634 to Lynn, incorporated herein by reference in its entirety, discloses a method for producing a blend of alpha- and beta-stucco including a slurry calcination step to produce alpha calcium sulfate hemi hydrate followed by a fluidized bed calcination step to produce beta calcium sulfate hemihydrate.

Methods for producing beta stucco are known in the art and include a batch process and continuous calcining in a kettle.

Before this patent application disclosure, it was previously accepted in the field that while batch-produced beta stucco is suitable for pottery plaster formulations, beta stucco produced by continuously calcining in a kettle ("CCK stucco") is not suitable for pottery plaster formulations because CCK stucco tends to hydrate by producing blocky or plate-like crystals and these crystals inhibit porosity and do not allow movement of water and air through a gypsum mold.

In this disclosure, "CCK stucco" is referred to stucco produced by continuous calcining of gypsum in a kettle. Preferably, the kettle contains a fluidized bed. Preferably, continuous calcining in a kettle is conducted at a temperature in the range from about 250° F. to about 600° F. More preferably, continuous calcining in a kettle can be conducted at a temperature in the range from 275° F. to 356° F. (135-180° C.). It is not necessary to increase pressure in the kettle. Instead, the process can be conducted at atmospheric pressure. In the continuous calcining in a kettle, gypsum can be continuously fed into the kettle from a conveyor terminating with an outlet to the kettle. CCK stucco can be continuously drawn out from the kettle without stopping operation of the kettle.

Kettles and methods for producing CCK stucco are known in the art, including as described in U.S. Pat. Nos. 3,307,915, 3,236,509, 4,113,836, 4,183,908, 4,201,595, 4,117,070 and 4,153,373, all incorporated herein by reference in their entirety.

Continuous calcination of gypsum in a kettle is of importance in economical production of gypsum stucco (calcium sulfate hemihydrate) especially adapted for use in gypsum board manufacture. As stated in U.S. Pat. No. 4,117,070, CCK stucco produced by the continuous calcining in a kettle differs principally from batch-process stucco in aging and setting properties. While CCK stucco is suitable for manufacturing gypsum panels from a gypsum slurry, it was generally recognized in the field that CCK stucco is not suitable for producing bag plaster.

Unexpectedly and despite the general understanding in the field, it has been discovered as provided in this disclosure that a suitable dry pottery plaster formulation (composition) can be made with CCK stucco if the formulation includes a combination of crystal growth modifiers, wherein the combination of crystal growth modifiers comprises, consists essentially of, or consists of Rochelle Salt and at least one of the following: potassium sulfate and/or one or more phosphate compounds. One of the technical advantages for this formulation is that this pottery plaster formulation can be stored in bags as dry mixture without adverse aging effects for a period of time, such as for example, 6 months or 12 months. Unexpectedly, after being mixed with water, the formulation sets into a gypsum mold with increased porosity, the porosity being comparable to formulations made with batch-made stucco.

In some preferred embodiments, a pottery plaster formulation (composition) may be a dry mixture comprising alpha-stucco, CCK stucco, Rochelle Salt, and one or more from potassium sulfate and/or a phosphate compound.

The pottery plaster formulations (compositions) according to this disclosure may have a water absorption capacity of at least 10 wt %, more preferably at least 25 wt %, and most preferably 30 wt %, calculated as an increase in pottery plaster weight measured in the full immersion test at 60 minutes.

In some preferred embodiments, a pottery plaster formulation according to this disclosure may be a dry mixture which contains from about 60 wt % to about 94 wt % of CCK stucco and about 40 wt % to about 5 wt % of alpha stucco. Preferably, the pottery plaster formulation may contain from about 70 wt % to about 85 wt % of CCK stucco and about 30 wt % to about 15 wt % of alpha stucco.

The pottery plaster formulations according to this disclosure contain Rochelle Salt in an amount from about 1 pound to about 4 pounds of Rochelle Salt per 2,000 pounds of the pottery plaster formulation. The pottery plaster formulations according to this disclosure may comprise from about 0.02 wt % to about 0.2 wt % of Rochelle Salt, and more preferably from about 0.02 wt % to about 0.1 wt % of Rochelle Salt.

In addition to Rochelle Salt, the pottery plaster formulations may contain potassium sulfate and/or one or more phosphate compounds. It has been discovered that it is not necessary to use both types of compounds: potassium sulfate and a phosphate compound. Instead, potassium sulfate or the phosphate compound may be used in combination with Rochelle Salt. If present, potassium sulfate or the phosphate compound may be preferably used in an amount from about 2 to about 6 pounds of potassium sulfate or the phosphate compound per 2,000 pounds of the pottery plaster formulation. The pottery plaster formulations according to this disclosure may comprise from about 0.05 wt % to about 0.5 wt % of potassium sulfate or the phosphate compound, and more preferably from about 0.05 wt % to about 0.3 wt % of potassium sulfate or the phosphate compound.

Suitable phosphate compounds for the pottery plaster formulations according to this disclosure include, but are not limited to, trimetaphosphate salts and tetrametaphosphate salts. Particularly preferred phosphate compounds include sodium trimetaphosphate ("STMP"), potassium trimetaphosphate, ammonium trimetaphosphate, sodium hexametaphosphate, tetrapotassium tripolyphosphate, ammonium polyphosphate, aluminum trimetaphosphate or any combination thereof. A particularly preferred phosphate compound is sodium trimetaphosphate ("STMP"). The pottery plaster formulations according to this disclosure may comprise from about 0.05 wt % to about 0.5 wt % of the phosphate compound, and more preferably from about wt % to about 0.3 wt % of the phosphate compound. However, the phosphate compound may be replaced with potassium sulfate in some embodiments.

Table 1 provides some preferred pottery plaster formulations according to this disclosure:

TABLE 1

| Pottery Plater Formulation | | |
| --- | --- | --- |
| Component | Amount (wt %) | Preferred Amount (wt %) |
| Alpha stucco | 5-40 | 15-30 |
| CCK stucco | 60-94 | 70-85 |
| Rochelle Salt | 0.02-0.2 | 0.02-0.1 |
| Potassium sulfate and/or the phosphate compound, e.g., STMP | 0.05-0.5 | 0.05-0.3 |

It has been unexpectedly discovered that the pottery plaster dry mixtures according to this disclosure may have a shelf life of at least 6 months, and more preferably of at least 12 months. Thus, the pottery plaster formulations according to this disclosure have a commercially advantageous anti-aging property.

In some embodiments, the pottery plaster formulations according to this disclosure may further comprise other additives, including additives which are typically used for controlling the setting reaction in a gypsum slurry. Such additives may include, but are not limited to, additives that slow down the setting reaction of stucco after it is mixed with water. These additives may be referred in this disclosure as set-retarding additives. Suitable set-retarding additives include, but are not limited to sodium citrate, Sodate™ (comprising plaster of Paris, sodium citrate and crystalline silica, available from USG, Illinois, USA), SUMA retarder which is a proteinaceous retarder produced from animal hair and/or hooves, cream of tartar (potassium bitartrate) and/or any combination thereof. If present, the set-retarding additive may be added to the dry mixture pottery plaster formulation is small amounts, e.g., from about 0.01 wt % to about wt % of the dry mixture, or the set-retarding additive may be added directly to a slurry when the pottery plaster formulation is mixed with water for making a mold.

In another aspect, this disclosure relates to pottery plaster slurries comprising one or more of the pottery plaster formulations according to this disclosure, water and optionally one or more additional additives for controlling the setting reaction of the pottery plaster slurry. These slurries include those with water-to-stucco ratio ("WSR") by weight in the range from about 0.5 to about 0.9, and more preferably from about 0.5 to about 0.8.

When more time may be needed for handling a pottery plaster slurry before it sets, the setting time of the pottery plaster slurry may be delayed up to several hours by using a small amount, e.g., 0.1 wt % to 5 wt %, of a suitable set-retarding additive such as for example, sodium citrate, Sodate™, SUMA retarder, cream of tartar and/or any combination thereof.

It was unexpectedly discovered as reported in this disclosure, including as shown in Table 2, that a mold produced from a pottery plaster slurry prepared with one or more of the pottery plaster formulations according to this disclosure has an increased porosity and it absorbs more water in comparison to molds produced with CCK stucco that do not comprise the combination of crystal growth modifiers disclosed in this disclosure. Furthermore, it was also unexpectedly discovered that as reported in this disclosure, including Table 2, the porosity of the pottery plaster mold according to this disclosure is comparable to the porosity of a mold prepared with batch-calcined stucco.

In this disclosure, the porosity of set pottery plaster can be measured by one of the two methods.

In the "full immersion" test, a cube of set pottery plaster is weighed and then the cube is immersed in water, and it is weighed every 5 minutes for one hour. The result of this test is reported as a percentage of weight that is gained as the cube absorbs water. The more water is absorbed, the more water absorbent and more porous the pottery plaster is.

In the "10 cc ring" absorption test, a volume of 10 cubic centimeters (cc) of water is placed in a cylinder on top of one side of a set pottery plaster cube with the size of 2"×2"×2". The test measures the time it takes for all of the water to soak down into the cube. A result is reported in cc/min.

The pottery plaster formulations according to this disclosure include those which have a weight increase of at least 10%, preferably 25% and most preferably at least 30% in the "full immersion" test at 60 minutes. Thus, technical advantages of the pottery plaster mold according to this disclosure include increased water absorption, preferably by at least 10 percent in comparison to molds prepared without the combination of crystal growth modifiers, and a better purge rate with which water is removed from a casting ceramic article. This results in decreasing the residency time for a casting ceramic article in the mold, making production more efficient.

The pottery plaster formulations according to this disclosure may be used for producing working molds for slip casting various ceramic items, including tableware (pots, plates, mugs, vases, etc.) and sanitaryware (toilets, sinks). This disclosure also provides methods for makings pottery plaster molds. The methods comprise mixing one or more of the pottery plaster formulations according to this disclosure with water into a pottery plaster slurry, preferably with a water-to-stucco ratio by weight in the range from about 0.5 to about 0.9, and more preferably from about 0.5 to about 0.8. Optionally, the methods may include adding one or more of set-retarding additives and/or other additives conventionally used with pottery plaster slurries. The pottery plaster slurry is then poured over a form and allowed to hydrate until the setting reaction is complete, the mold has hardened and can be removed from the form.

In yet another aspect, this disclosure relates to methods for making a ceramic article by slip casting. In these methods, a mold made from the pottery plaster slurry according to this disclosure is used. A clay slurry, which is referred to as a clay slip, comprising at least clay, silica and water may be prepared according to any standard formulation used in clay slips for making ceramic pottery and other ceramic wares. The clay slip is then poured into the pottery plaster mold according to this disclosure. Water from the forming ceramic article is absorbed through the pottery plaster mold. The forming process may be accelerated by applying negative (less then atmospheric) pressure to the mold and/or applying a positive (above atmospheric) pressure to the forming ceramic article. This process is known as pressure casting. The pottery plaster molds according to this disclosure are suitable for pressure casting. The pottery plaster molds according to this disclosure have an increased water absorption and accordingly, they absorb water from a clay slip and reduce the time required for greenware to form, leading to the greenware ceramic article being ready for removal from the mold sooner. After the greenware ceramic article is removed from the mold, the article can be further processed, including drying in an oven, painting, glazing and/or by applying any other techniques conventionally used for producing ceramic articles. The freed-up mold can be reused for making another article. However, before the mold can be used for casting another article, the mold must be dried. In order to purge water from the mold, it can be treated with heat and/or pressure to drive off the absorbed water. The molds according to this disclosure are durable enough to be used for at least and preferably at least 80 cycles of casting. These molds are strong enough for drying by applying heat and/or pressure.

The invention will be now further described by the following non-limiting examples.

Example 1. Preparing and Testing Pottery Plaster Formulations

Pottery plaster formulations according to this disclosure were prepared by dry mixing components shown in Columns "Trial #2" and "Trial #3" of Table 2. As a control, a pottery plaster formulation was prepared with batch beta-molding plaster as shown in Column "Control" of Table 2. For a comparative analysis, a pottery plaster formulation was also prepared with CCK stucco, but without the combination of crystal growth modifiers, as shown in Column "Trial #1."

These pottery plaster formulations were then mixed into slurries with water at normal consistency of 62 cc of water per 100 grams of pottery plaster formulations in Control and Trial #1 mixtures, or at normal consistency of 64 cc of water per 100 grams of pottery plaster formulations in Trial #2 and Trial #3, as shown in Table 2 below. The pottery plaster slurries were allowed to set and were tested as shown in Table 2.

TABLE 2

| Pottery Plaster Formulations No 1 Pottery Plaster with CCKS (0422) | | | | |
|---|---|---|---|---|
| Bag Code: | Control | Trial #1 | Trial #2 | Trial #3 |
| Formulations: (lb/ton) | | | | |
| Alpha stucco (HYDROCAL ® B-Base) | 400 | 400 | 400 | 400 |
| Batch Beta-stucco (Batch Molding Plaster) | 1600 | | | |
| CCK Stucco (White CCKS (#1) Molding Plaster) | | 1600 | 1594 | 1594 |
| Potassium Sulfate | | | 4 | |
| Rochelle Salt | | | 2 | 2 |
| STMP (MCM) | | | | 4 |
| Sodate Retarder | | | | |
| Total: | 2000 | 2000 | 2000 | 2000 |
| Normal Consistency (cc) | 62 | 62 | 64 | 64 |
| Patty Diameter (in.) | 3¾ | 3¹¹/₁₆ | 3¾ | 3¾ |
| Hand Mix Stiffening @ NC (min.) | 12 | 21.5 | 16.5 | 23 |
| Hand Mix Vicat Set @ NC (min.) | 24 | 32.5 | 26 | 33 |
| Test Consistency (cc) | 70 | 70 | 70 | 70 |
| Hobart Machine Mix Vicat Set @ TC (min.) | 16 | 26 | 23 | 29 |
| 1 Hour Compressive Strength (psi) | 1094.3 | 1052.5 | 1027.0 | 1057.8 |
| Dry Compressive Strength (psi) | 2446.8 | 2495.9 | 2481.5 | 2485.2 |
| 10 cc Ring Water Absorption Test (cube 2" × 2" × 2") (cc/min.) | 3.67 | 1.81 | 3.38 | 2.18 |
| Avg. Full Immersion Water Absorp. @ 60' (%) | 33.2 | 23.7 | 31.6 | 24.5 |

As reported in table 2 above, the pottery plaster formulations according to this disclosure (trial #2 and trial #3) have an increased water absorption in comparison to the trial #1 formulation prepared with CKC stucco, but without a combination of Rochelle salt and Potassium Sulfate and without a combination of Rochelle salt and the phosphate compound. Furthermore, it was observed that the water absorption in the pottery plaster formulations according to this disclosure (trial #2 and trial #3) was comparable with a control pottery plaster formulation made with batch-calcined stucco.

We claim:

1. A pottery plaster composition, wherein the pottery plaster composition is a dry mixture consisting of:
   5-40 wt % alpha-calcined stucco;
   60-94 wt % continuously-calcined-in-a-kettle (CCK) stucco;
   0.02-0.2 wt % Rochelle salt; and
   0.05-0.5 wt % at least one of the following: potassium sulfate and/or one or more phosphate compounds; and wherein the pottery plaster composition has a water absorption capacity of at least 10 wt %, calculated as an increase in pottery plaster weight measured in the full immersion test at 60 minutes.

2. The pottery plaster composition of claim 1, wherein the phosphate compound includes one or more of a trimetaphosphate salt and/or a tetrametaphosphate salt.

3. The pottery plaster composition of claim 1, wherein the pottery plaster composition consists of:
   15-30 wt % alpha-calcined stucco;
   70-84 wt % CCK stucco;
   0.02-0.1 wt % Rochelle Salt; and
   0.05-0.3 wt % potassium sulfate.

4. The pottery plaster composition of claim 1, wherein the pottery plaster composition has a shelf-life of at least 6 months.

5. The pottery plaster composition of claim 1, having the water absorption capacity of at least 25 wt %, calculated as an increase in pottery plaster weight measured in the full immersion test at 60 minutes.

6. The pottery plaster composition of claim 5, having the water absorption capacity of at least 30 wt %, calculated as an increase in pottery plaster weight measured in the full immersion test at 60 minutes.

7. A pottery plaster slurry comprising the pottery plaster composition of claim 1 and water, wherein the pottery plaster slurry has a water to alpha-calcined and CCK stuccos ratio by weight in the range from about 0.5 to about 0.9.

8. The pottery plaster slurry of claim 7, wherein the pottery plaster slurry further comprises a set-retarding agent.

9. The pottery plaster slurry of claim 8, wherein the set retarding agent is used in an amount from about 0.1 wt % to about 5 wt %, based on a weight of the pottery plaster composition.

10. A method of making a pottery plaster mold, the method comprising:
   i) mixing a pottery plaster slurry comprising the pottery plaster composition of claim 1 and water into a mixture;
   ii) pouring the mixture into a form; and
   iii) removing the pottery plaster mold from the form after the mixture hardened.

11. The method of claim 10, wherein the mixture has a water to alpha-calcined and CCK stucco ratio by weight in the range from about 0.5 to about 0.9.

12. The method of claim 10, wherein the method further comprises adding to the mixture in step i) one or more set-retarding agents.

13. A method for slip casting a ceramic article, the method comprising:
   i) preparing a clay slip;
   ii) pouring the clay slip into a pottery plaster mold, wherein the pottery plaster mold comprises the pottery plaster composition of claim 1;
   iv) casting a ceramic article in the pottery plaster mold; and
   v) removing the ceramic article from the pottery plaster mold.

14. The method of claim 13, wherein the casting includes removing water from the casting ceramic article under negative pressure applied to the pottery plaster mold.

15. The method of claim 13, wherein the method further comprises drying the pottery plaster mold after step v).

16. The method of claim 15, wherein the method further comprises repeating steps i) to v) at least once.

* * * * *